United States Patent
Bai et al.

(10) Patent No.: US 8,362,438 B2
(45) Date of Patent: Jan. 29, 2013

(54) USE OF HYBRID COLLIMATION FOR INTERLEAVED EMISSION AND TRANSMISSION SCANS FOR SPECT

(75) Inventors: Chuanyong Bai, Poway, CA (US); Richard Louis Conwell, Del Mar, CA (US)

(73) Assignee: Digirad Corporation, Poway, CA (US)

( * ) Notice: Subject to any disclaimer, the term of this patent is extended or adjusted under 35 U.S.C. 154(b) by 217 days.

(21) Appl. No.: 12/870,239

(22) Filed: Aug. 27, 2010

(65) Prior Publication Data

US 2011/0079724 A1 Apr. 7, 2011

Related U.S. Application Data

(60) Provisional application No. 61/237,494, filed on Aug. 27, 2009.

(51) Int. Cl.
*H01L 27/146* (2006.01)

(52) U.S. Cl. ................................. 250/370.09

(58) Field of Classification Search .................. 250/362, 250/363.01–363.1, 370.01–370.15; 378/98.8
See application file for complete search history.

(56) References Cited

U.S. PATENT DOCUMENTS

| 4,181,839 A * | 1/1980 | Hatton et al. ................. 378/148 |
| 4,748,328 A * | 5/1988 | Chang et al. ............. 250/363.04 |
| 6,324,258 B1 * | 11/2001 | Beekman ....................... 378/145 |
| 2007/0090300 A1 * | 4/2007 | Sibomana et al. ........ 250/370.09 |

FOREIGN PATENT DOCUMENTS

JP 61159179 A * 7/1986

OTHER PUBLICATIONS

Bai et al., "Hybrid parallel-slant hole collimators for SPECT imaging," 2004, IEEE Transactions on Nuclear Science, vol. 51, No. 3, pp. 619-624.*

Gullberg et al., "Cardiac single-photon emission-computed tomography using combined cone-beam/fan-beam collimation," 2005, IEEE Nuclear Transactions on Nuclear Science, vol. 52, No. 1, pp. 143-153.*

* cited by examiner

*Primary Examiner* — Kiho Kim
(74) *Attorney, Agent, or Firm* — Law Office of Scott C. Harris, Inc.

(57) ABSTRACT

Two different collimation geometries are interleaved. Each collimation geometry samples a transaxial slice through the object being imaged. The even slices are of the same fan-beam geometry as the central head, but the odd slices are of different collimation geometry. Each slice covers an axial range that is the same as the pixel size of the solid-state detector, and aligns with the corresponding pixels in the axial direction.

11 Claims, 1 Drawing Sheet

Figure 1:
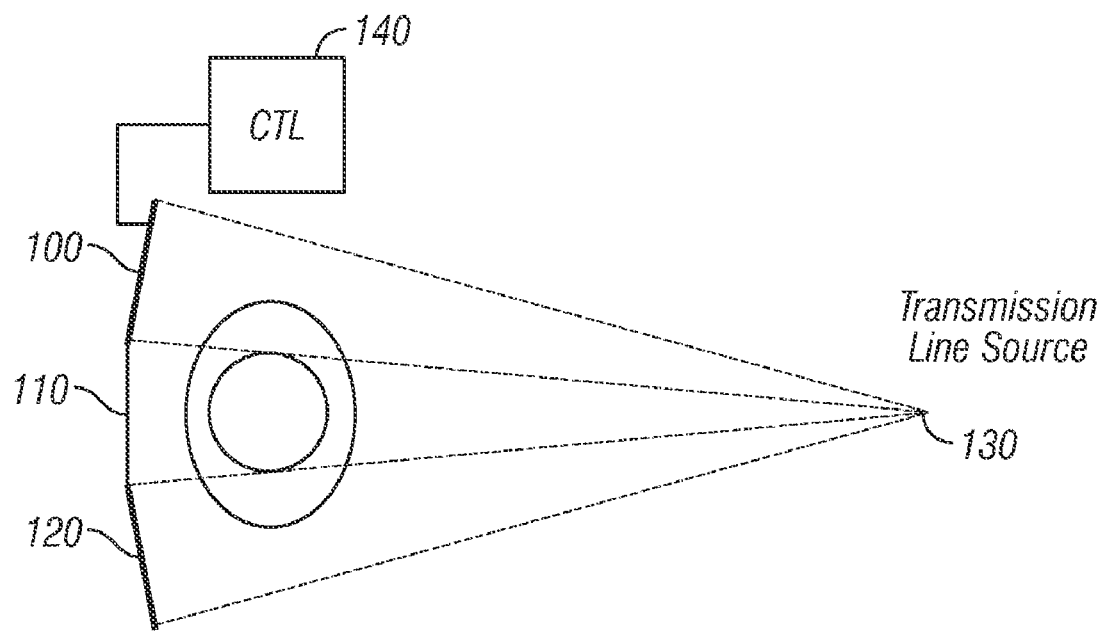

USE OF HYBRID COLLIMATION FOR INTERLEAVED EMISSION AND TRANSMISSION SCANS FOR SPECT

This application claims priority from provisional application No. 61/237,494, filed Aug. 27, 2009, the entire contents of which are herewith incorporated by reference.

BACKGROUND

For SPECT imaging with attenuation correction (AC), attenuation maps are usually obtained using one of the following techniques:

(A) Isotopic transmission sources may be used with the same conventional Anger cameras that are also used for emission acquisition, or (B) CT images that are obtained using a separate set of detectors for X-ray detection.

When isotopic transmission sources are used, simultaneous emission/transmission scans or interleaved transmission/emission scans can be used to create perfect emission/transmission registration. However, these transmission scans can take a long time as compared to emission scans.

CT image scans in approach (B) allows very fast CT scans and high quality attenuation maps converted from the CT images. However, the CT scans require the use of a separate detector set. Also, the transmission and emission scans are sequential. In addition, fast CT scans are also subjected to respiratory motion related misregistration with emission scans and CT scans are in general associated with large patient doses.

SUMMARY

According to embodiments, a plurality of collimators are used which have interleaved collimation geometries including a first collimation geometry that scans in a fan beam geometry and a second collimation geometry that carries out a different scanning geometry; and at a first plurality of times, using said collimators in said first geometry to sample an object and obtain data about the object; and at a second, plurality of times, using said collimators in said second geometry to sample a different slice of information through the object being imaged.

Figure 2:
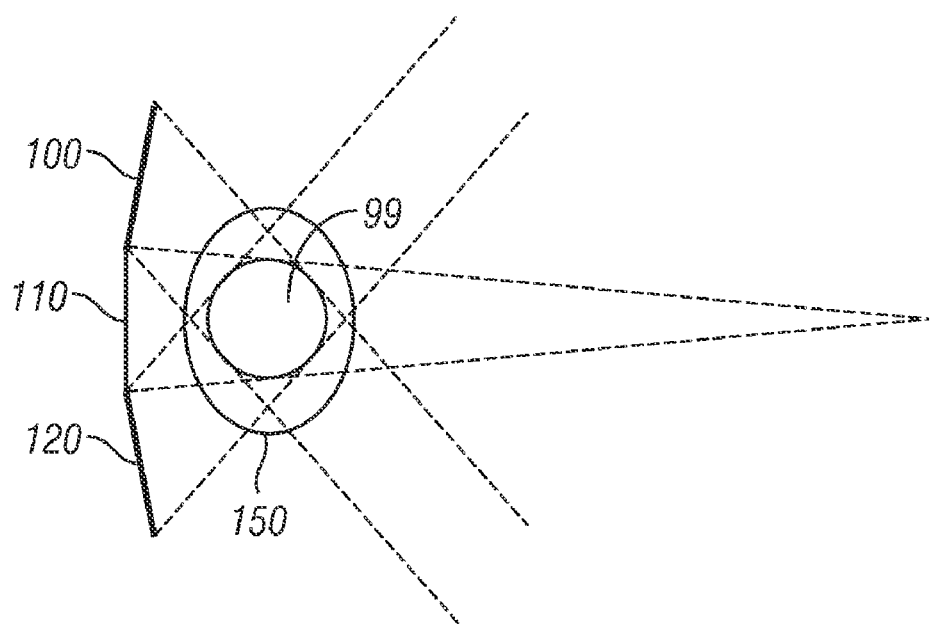

BRIEF DESCRIPTION OF THE DRAWINGS in the drawings:

FIG. 1 shows the hybrid collimation and data acquisition geometry for an even axial slice of an embodiment; and FIG. 2 shows the hybrid collimation and data acquisition geometry for an odd axial slice of an embodiment.

DETAILED DESCRIPTION

Recently, Digirad Corporation developed a SPECT system with AC (X-ACT) that uses the same set of solid state detectors for both emission and transmission scans. The solid state detectors can handle $5 \times 10^6$ cps per 20 cm×15 cm detector area. The system has three 20 cm×15 cm small detectors, mounted with fan-beam collimators with focal length of 150 cm. For emission acquisition, the three head configure to a triple-head system for maximized sensitivity. The central line of the fan-beam geometry of each head points to axis-of-rotation (AOR). After emission acquisition is completed, the three heads reconfigure to form a large detector arc for transmission scan to maximize the transmission field-of-view (FOV). The focal line of the fan-beam collimation of each of the detector heads co-aligns with a transmission line source. The transmission line source is generated by appropriately collimating the lead fluorescence x-ray photons generated by a lead target when the lead target is illuminated by a polychromatic X-ray beam from an X-ray tube. When the X-ray tube operates at 160 kVp and 2.0 mA, the transmission density is about 2,000 cps per 3.5 mm×3.5 mm pixel, or 80 times that when using isotopic sources. High quality transmission scans can be obtained in 1 minute with patient dose less than 5 uSv.

The XACT system, therefore, combines the advantages of (1) using the same detector heads as in approach (A) and (2) fast and high quality transmission scan as in approach (B) but with negligible patient dose as compared to CT scans and there is no respiratory motion introduced emission/transmission misregistration.

More details of the above discussion and related references can be found in Bai C, Conwell R, Kindem J, Babla H, Gurley M, De Los Santos R, Old R, Weatherhead R, Arram S, and Maddahi J 2009 Evaluation of a fully-integrated cardiac SPECT/VCT system that uses a common set of solid-state detectors for both emission and transmission scans and a novel low dose lead fluorescence X-ray transmission line source (J. Nucl. Cardiol., 2010; 17:459-69).

Even though the X-ACT system has the above stated advantages, the transmission and emission scans are sequential. The inventors noticed a number of problems with this approach.

First, the detector heads need to be reconfigured after the emission scan for the transmission scan. Additional and reliable mechanics are required to reposition the detector head, and sometimes operator interactions are needed;

Also, transmissions/emission co-registration phantoms and QC procedures are required, and co-registration QC has to be performed periodically;

Since emission contamination is not negligible for accurate transmission reconstruction, an emission contamination scan data set often needs to be acquired, which may add to the total transmission scan time.

One straightforward approach to minimize these issues is to use a single large FOV detector with the same collimation to replace the three small heads. In this way, emission data and transmission data can be obtained in an interleaved manner so that no detector reconfiguration or co-registration QC is needed. The acquired emission data can be used for emission contamination of the transmission data, and therefore, there is no need for dedicated emission contamination scan.

This may reduce the system sensitivity for emission data acquisition (only ⅓ of the X-ACT). More efficient collimators to improve the system sensitivity for emission data acquisition could be used, but this can compromise the eventual system resolution.

An object is to minimize the above stated weaknesses of the X-ACT system while achieving reasonable high system sensitivity and resolution. Other applications, however, are possible.

Embodiments describe the use of hybrid collimation geometry to replace the fan-beam collimation geometry used for the XACT system. In one embodiment, the collimators used for the central head stays the same, but the collimators for the two side heads will be hybrid collimators.

In the axial direction of each of the hybrid collimators, two different collimation geometries are interleaved. Each collimation geometry samples a transaxial slice through the object being imaged. The even slices are of the same fan-beam geometry as the central head, but the odd slices are of different collimation geometry. Each slice covers an axial range that is the same as the pixel size of the solid-state detector, and aligns with the corresponding pixels in the axial direction.

FIGS. 1 and 2 depict the hybrid collimation of an embodiment and the geometry for data acquisition.

When mounted with the collimators, the three heads are positioned in the same way as for the X-ACT transmission scan. FIG. 2 shows the collimation of the odd slices of the hybrid collimators, where the two side detectors 100 and 120 point to the AOR of the patient chair 150, at which the organ-of-interest 99, such as the heart for cardiac SPECT, is positioned during patient setup. FIG. 1 shows the collimation of the even slices of the hybrid collimators. During the even slices, the collimation of all the heads 100, 110, 120 all point to the transmission line source 130 in the same way as in XACT transmission scan configuration.

FIG. 1 shows the hybrid collimation and data acquisition geometry for an even axial slice. The central head and the even slices of the two side heads have the same fan-beam geometry. Their focal lines all co-align with the transmission line source. Emission and transmission scans are interleaved, i.e., at each patient rotation with the chair, emission scan is acquired followed by the transmission scan, then the chair rotates to the next angle for another emission scan followed by transmission scan, and so on. The even slices of the two side heads and the central head acquire large FOV emission and transmission data. The dashed lines illustrate the collimation.

Of course, even and odd can be reversed, and different operations other than alternate scans can be used.

FIG. 2 shows the hybrid collimation and data acquisition geometry for an odd axial slice. The odd slices of the two side heads and the central head each acquire a complete, small FOV emission data during emission acquisition. The odd slices of the two side heads do not acquire transmission data. The dashed lines illustrate the collimation.

A controller 140 controls the alternative scanning operations.

Once the detectors are properly positioned, they are fixed and not moved during data acquisition. During data acquisition, using step-and-shoot mode as an example, at each chair rotation angle, emission data are first acquired, for example for 10 seconds, then transmission data are acquired, for example, for 0.5 second. Then the chair rotates to the next angle to acquire emission data followed by transmission data and so on till the last chair rotation angle.

In this way, emission data and transmission data are acquired in an interleaved manner. The transmission data is acquired over a much shorter period of time than the emission data (0.5 s vs 10 s). This causes the emission and transmission data to be co-registered intrinsically.

The X-ACT system has a 6.5 mm pixel size for all the three detector heads. To achieve the same axial resolution when using the hybrid collimators, the two side heads will use 3.25 mm pixel size. The central head can use either 6.5 mm pixel size or 3.25 mm pixel size. Transmission data are acquired by the central head and the even slices with fan-beam collimation of the two side heads. Transmission scans, therefore, have the same axial and transaxial FOV as the X-ACT.

For emission data, a complete, large FOV fan-beam data set is acquired by the central head and the even slices of the two side heads. Two complete, small FOV data sets of the organ-of-interest (cardiac for cardiac SPECT) are acquired by the odd slices of the two side heads.

When using this invention for cardiac SPECT with AC, as compared the X-ACT system, the advantages are as follows:

According to embodiments, there is no need to reposition the detector heads between emission and transmission scans, reducing system complexity and increasing system reliability. This also improves the workflow for the users.

Emission and transmission scans are interleaved and intrinsically co-registered, increasing the accuracy of AC.

Emission/transmission coregistration QC is not needed, improving workflow and decreasing cost (no registration phantoms are needed, no need to prepare source, etc).

A complete, large FOV, high resolution emission data set is acquired. This will improve the accuracy of AC and allow more advanced scatter modeling for scatter correction, such as the approach in Bai C, Zeng G L, and Gullberg G T 2000, A slice-by-slice blurring model for 3D scatter compensation in parallel and converging beam SPECT Phys. Med. Biol. 45 1275-1307. It also eliminates the truncation ring in the emission images as compared to XACT.

Two complete, small FOV emission data sets are acquired using the two side detectors, achieving high system sensitivity for the imaging of the organ-of-interest. Depending upon the collimation used for the odd slices of the two side detectors, the overall system sensitivity of imaging the organ of interest varies. For example, When using the geometry shown in FIG. 1 and FIG. 2, if the AOR is 40 cm away for the central head, if the odd slices of the two side detectors use slant-parallel collimation with slant angle 30°, each head is equivalent to 0.32 times the sensitivity of a single head with parallel collimation. The overall sensitivity to the organ of interest is 1.64 times that of a single head (as compared to roughly 3.0 times that of a single head for triple-head configuration in X-ACT when without considering the fan-beam magnification factor). The resulted emission FOV of the two side heads are 18.8 cm.

One can use multiple diverging collimation sections for the odd slices to improve the emission sensitivity of the two side head for the imaging of organ of interest, such as that described in Zeng G L and Stevens A M 2009 Multidivergent-beam stationary cardiac SPECT (Med. Phys. 2009; 36:1-10). When using diverging collimation with sensitivity gain of 1.8 and two diverging sections, then the sensitivity of each of the side head can be 1.15 times that of a single head. The overall system sensitivity to the imaging of organ of interest is thus 3.30 times that of a single head camera.

During the emission scan, a large FOV contamination data can be acquired (simultaneously with the emission data acquisition) using the energy window of the transmission scan. The contamination data is acquired at exactly the same geometry as the transmission data but over a typically much longer time. Therefore, that data can serve as a low-noise emission contamination data set for transmission reconstruction, therefore, eliminating the requirement of acquiring additional emission contamination scans. This saves time and improves workflow.

The transmission data, due to its low noisy level, may be used for patient motion correction, either by replacing or by providing complimentary information to the mostly used emission-based motion correction.

Other uses of this invention include, but are not limited to:

The invention can be used for a system with different number of heads. For example, for a single, large FOV detector, one can use a hybrid collimator that is the combination of the collimators used for the three heads above. The collimator will have three sections, the center section is the same as that for the central head discussed above, and the two side sections the same as the two collimators for the two side heads of the above discussion. However, the collimation angle of the two side sections may need to be adjusted, unless the detector crystal is curved in the same way as shown in FIGS. 1 and 2.

The collimation for the central head can be designed similarly to that of the side heads to further improve the emission sensitivity to the imaging of organ of interest.

This invention is not limited to the emission and transmission scans. It can be used for both emission scans. Such as applications in which high system sensitivity (of emission scans) for an organ of interest is desired, but in the mean while a large FOV, high resolution image (from emission scans) of the object/patient is also desired for better localization/diagnosis. For this purpose, the two emission scans can be done simultaneously.

Use of this invention requires an emission reconstruction algorithm than can model the different collimation geometry of the data acquisition. Accurate spatial response is critical.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the above has described the Digirad "X Act", but other systems can be used. The above has described discriminating between even and odd scans, however, other discriminations can be done.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

Any of the operations described herein can be carried out on a computer, which may be any kind of computer, either general purpose, or some specific purpose computer such as a workstation.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed. For example, even and odd as described herein can be reversed.

What is claimed is:

1. A method comprising:
    using a plurality of collimators which have interleaved collimation geometries including a first collimation geometry that has a fan beam geometry and a second collimation geometry that carries out a different scanning geometry;
    at a first plurality of times, using said collimators in said first geometry to sample an object and obtain data about the object into at least one detector head; and
    at a second plurality of times, using said collimators in said second geometry to sample a different slice of information through the object being imaged into at least one detector head, wherein said first geometry and said second geometry carry out said imaging without moving the at least one detector head, wherein said first plurality of times are interleaved between said second plurality of times.

2. A method as in claim 1, wherein said first geometry and said second geometry carry out said imaging without moving the at least one detector head.

3. A method as in claim 2, wherein said first and second plurality of times are simultaneous.

4. A method as in claim 3, wherein said first and second plurality of times are used to acquire small and large fields of view simultaneously.

5. A method as in claim 1, wherein all the scanning heads use interleaved collimation.

6. A method as in claim 1, wherein there is at least one large FOV scanning heads, each of said scanning heads being mounted with a collimator with multiple collimation sectors.

7. A method as in claim 1 wherein said first geometry points towards a transmission line source, and the second geometry points towards the object being imaged.

8. A method comprising:
    using a plurality of collimators which have interleaved collimation geometries including a first collimation geometry that has a fan beam geometry and a second collimation geometry that carries out a different scanning geometry;
    at a first plurality of times, using said collimators in said first geometry to sample an object and obtain data about the object into at least one detector head; and
    at a second plurality of times, using said collimators in said second geometry to sample a different slice of information through the object being imaged into at least one detector head, wherein said first geometry and said second geometry carry out said imaging without moving the at least one detector head, wherein said first plurality of times are one of even or odd time periods, and said second plurality of times are the other of said even or odd time periods.

9. A method comprising:
    using a plurality of collimators which have interleaved collimation geometries including a first collimation geometry that has a fan beam geometry and a second collimation geometry that carries out a different scanning geometry;
    at a first plurality of times, using said collimators in said first geometry to sample an object and obtain data about the object into at least one detector head; and
    at a second plurality of times, using said collimators in said second geometry to sample a different slice of information through the object being imaged into at least one detector head, wherein there are multiple scanning heads, and one of said scanning heads does not use interleaved collimation.

10. A method as in claim 9, wherein at least one of the collimation sectors have non-interleaved collimation.

11. A medical scanner having plural different scanning heads having two different interleaved collimation geometries, where each collimation geometry samples a transaxial slice through an object being imaged, including a first plurality of slices through the object that points toward a transmission line source, and a second plurality of slices, which have a different collimation geometry, pointing to an organ of interest, wherein there are multiple scanning heads, and one of said scanning heads does not use interleaved collimation.

* * * * *